United States Patent
Lee et al.

(10) Patent No.: US 10,247,950 B2
(45) Date of Patent: Apr. 2, 2019

(54) THREE-DIMENSIONAL IMAGE DISPLAY DEVICE

(71) Applicant: SAMSUNG DISPLAY CO., LTD., Yongin, Gyeonggi-do (KR)

(72) Inventors: Seung-Hoon Lee, Hwaseong-si (KR); Soohee Oh, Gunpo-si (KR); Haeyoung Yun, Suwon-si (KR); Junghwan Yi, Seoul (KR); Jinhwan Kim, Suwon-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 1085 days.

(21) Appl. No.: 14/249,446

(22) Filed: Apr. 10, 2014

(65) Prior Publication Data

US 2015/0077667 A1  Mar. 19, 2015

(30) Foreign Application Priority Data

Sep. 16, 2013 (KR) .................. 10-2013-0111385

(51) Int. Cl.
| | |
|---|---|
| H04N 13/317 | (2018.01) |
| H04N 13/324 | (2018.01) |
| H04N 13/356 | (2018.01) |
| H04N 13/305 | (2018.01) |
| H04N 13/31 | (2018.01) |
| G02B 27/22 | (2018.01) |
| G02F 1/1335 | (2006.01) |

(52) U.S. Cl.
CPC ... *G02B 27/2214* (2013.01); *G02F 1/133526* (2013.01); *H04N 13/305* (2018.05); *H04N 13/317* (2018.05); *H04N 13/324* (2018.05); *H04N 13/31* (2018.05); *H04N 13/356* (2018.05)

(58) Field of Classification Search
CPC .......... G02B 27/2214; H04N 13/0415; H04N 13/0404; H04N 13/0452; G02F 1/133526
See application file for complete search history.

(56) References Cited

U.S. PATENT DOCUMENTS

| | | | |
|---|---|---|---|
| 6,064,424 A | 5/2000 | Van Berkel et al. | |
| 2008/0204550 A1 | 8/2008 | De Zwart et al. | |

(Continued)

FOREIGN PATENT DOCUMENTS

WO  WO 2006117707  11/2006

*Primary Examiner* — Alexander Gross
(74) *Attorney, Agent, or Firm* — F. Chau & Associates, LLC.

(57) ABSTRACT

A three-dimensional display panel includes an array of pixels arranged in row and column directions, and at least one lenticular lens configured to form N viewpoints in different directions. The at least one lenticular lens has a longitudinal axis inclined by an angle of θ with respect to a column direction of the pixel, and a pitch P of the at least one lenticular lens in the row direction thereof satisfies $$\left(\frac{N}{S}\right)A < P < \left(\frac{(N+1)}{S}\right)A,$$

where N is the number of the viewpoints and is an integer greater than or equal to 1, S is the number of the lenticular lenses used to form the N viewpoints and is an integer greater than or equal to 1, and A is a width of each pixel in the row direction.

11 Claims, 15 Drawing Sheets

(56) References Cited

U.S. PATENT DOCUMENTS

| | | | |
|---|---|---|---|
| 2012/0092763 A1* | 4/2012 | Song | G02B 27/2214 |
| | | | 359/463 |
| 2012/0200677 A1* | 8/2012 | Saishu | G02B 27/225 |
| | | | 348/51 |
| 2013/0120366 A1 | 5/2013 | Lee et al. | |
| 2013/0208357 A1* | 8/2013 | Saito | G03B 35/18 |
| | | | 359/463 |
| 2013/0249896 A1* | 9/2013 | Hamagishi | H04N 13/0404 |
| | | | 345/419 |
| 2014/0118412 A1 | 5/2014 | Lee et al. | |
| 2014/0168390 A1* | 6/2014 | Cho | H04N 13/0404 |
| | | | 348/54 |

\* cited by examiner

THREE-DIMENSIONAL IMAGE DISPLAY DEVICE

CROSS-REFERENCE TO RELATED APPLICATIONS

This application claims priority under 35 U.S.C. § 119 from Korean Patent Application No. 10-2013-0111385, filed on Sep. 16, 2013 in the Korean Intellectual Property Office and all the benefits accruing therefrom, the contents of which are herein incorporated by reference in their entirety.

BACKGROUND OF THE INVENTION

Exemplary embodiments of the inventive concept are directed to a three-dimensional (3D) image display device, and in particular, to a 3D image display device with improved 3D image quality.

An autostereoscopic 3D display technology allows a viewer to perceive 3D images without wearing shutter glasses. An autostereoscopic 3D imaging devices uses a parallax barrier or a lenticular lens to realize a 3D display.

A parallax barrier 3D image display device includes a parallax barrier that has vertical-grating-shaped apertures and that is disposed in front of a display panel that has pixels arranged in a matrix array. A parallax barrier projects a left-eye image and a right-eye image, which have a binocular disparity, to a left eye and a right eye of a viewer, respectively, so that a viewer perceives different images through the left and right eyes thereof.

A lenticular lens 3D image display device uses a lenticular lens sheet instead of a vertical-grating-shaped parallax barrier. A lenticular lens sheet includes semi-cylindrical lenses that are provided on the display panel and arranged in a column direction.

In particular, a lenticular device capable of operating in 2D or 3D mode includes two substrates, a liquid crystal provided between the substrates, and electrodes provided on one of the substrates. The electrodes may cause the liquid crystal to take on the shape of a lenticular lens. A lenticular device is disposed on the display panel and may be operated in 2D or 3D mode by changing voltages applied to the electrodes.

SUMMARY

Exemplary embodiments of the inventive concept provide 3D imaging devices may reduce the dependence of optical characteristics. such as image confusion and brightness uniformity, on a viewing angle in a 3D operation mode.

According to exemplary embodiments of the inventive concept, a three-dimensional display panel includes an array of pixels arranged in row and column directions, and at least one lenticular lens configured to form N viewpoints in different directions.

The at least one lenticular lens has a longitudinal axis inclined by an angle of θ to a column direction of the pixel, and a pitch P of the lenticular lens in the row direction thereof satisfies $$\left(\frac{N}{S}\right)A < P < \left(\frac{(N+1)}{S}\right)A,$$

where N is the number of the viewpoints and is an integer greater than or equal to 1, S is the number of lenticular lenses used to form the N viewpoints and is an integer greater than or equal to 1, and A is a width of each pixel in the row direction.

According to exemplary embodiments of the inventive concept, a three-dimensional display panel includes an array of pixels arranged along row and column directions, and at least one lenticular lens configured to form N viewpoints in different directions.

The at least one lenticular lens has a longitudinal axis inclined by an angle of θ with respect to a column direction of the pixel, and the angle θ satisfies the inequality of θ≠tan−1(q), wherein q is an aspect ratio of each pixel.

According to exemplary embodiments of the inventive concept, a three-dimensional display panel includes an array of pixels arranged along row and column directions, and at least one lenticular lens configured to form N viewpoints in different directions.

The at least lenticular lens has a longitudinal axis inclined by an angle of θ with respect to a column direction of the pixel, and is configured to have an optimal viewing width W given by $$W = \frac{rp \times OVD}{gap},$$

where rp is a number of pixels used to display N viewpoints, OVD is an optimal viewing distance from the at least one lenticular lens to a viewer's eyes, and gap is a distance from the pixels to a surface of the at least one lenticular lens. The number of pixels rp used to display N viewpoints satisfies N<rp<(N+1).

DETAILED DESCRIPTION

Figure 1:
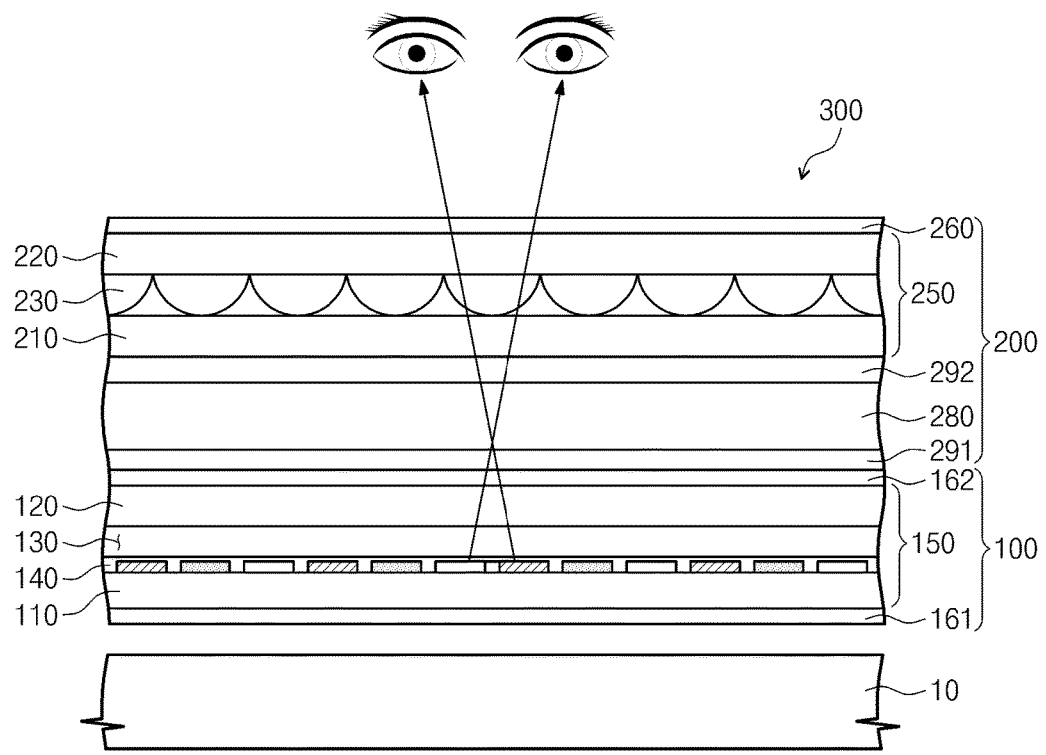
FIG. 1 is a sectional view that schematically illustrates a 3D image display device according to exemplary embodiments of the inventive concept.

Exemplary embodiments of the inventive concepts will now be described more fully with reference to the accompanying drawings, in which exemplary embodiments are shown. Exemplary embodiments of the inventive concepts may, however, be embodied in many different forms and should not be construed as being limited to the embodiments set forth herein. In the drawings, the thicknesses of layers and regions may be exaggerated for clarity. Like reference numerals in the drawings may denote like elements, and thus their description will be omitted.

It will be understood that when an element is referred to as being "connected" or "coupled" to another element, it can be directly connected or coupled to the other element or intervening elements may be present. Like numbers may indicate like elements throughout.

FIG. 1 is a sectional view that schematically illustrates a three-dimensional (3D) image display device according to exemplary embodiments of the inventive concept.

Referring to FIG. 1, a 3D imaging device 300 may include a backlight unit 10, a two-dimensional (2D) image display portion 100, and a 2D/3D converting part 200.

The 2D image display portion 100 may include a liquid crystal display panel 150 with a pixel array 140. The pixel array 140 may include pixels arranged in row and column directions. The liquid crystal display panel 150 may serve as a 2D display panel that displays 2D images. In other embodiments, the 2D image display portion 100 may include other display panels, such as an organic electroluminescent device or an electrophoresis device, in place of the liquid crystal display panel 150.

The liquid crystal display panel 150 may include a first substrate 110, a second substrate 120 facing the first substrate 110, and a liquid crystal layer 130 interposed between the first and second substrates 110 and 120.

The pixel array 140 may be disposed on the first substrate 110 and includes a plurality of pixel electrodes. The plurality of pixel electrodes may be arranged in the form of a matrix. The pixel array 140 may further include a plurality of gate lines that extend along the row direction, a plurality of data lines that extend along the column direction, and thin film transistors connected to the pixel electrodes, respectively.

In addition, the pixel array 140 may further include a color filter layer that includes red, green, and blue color pixels R, G, and B. The plurality of pixel electrodes may be disposed on the color filter layer. In exemplary embodiments, the pixel electrodes may be disposed on the color pixels R, G, and B in a one-to-one correspondence.

The liquid crystal layer 130 may include a plurality of liquid crystal molecules, and an orientation direction of the liquid crystal molecules may be controlled by an electric field between the first and second substrates 110 and 120.

First and second polarizing plates 161 and 162 may be attached to top and bottom surfaces of the liquid crystal display panel 150.

The 2D/3D converting part 200 may be included in the 3D image display device 300 for switching an operation mode of the 3D image display device 300 from a 3D mode to a 2D mode or vice versa. The operation mode of the 3D image display device 300 may be switched by turning the 2D/3D converting part 200 on or off. For example, if the 2D/3D converting part 200 is turned on, 2D images from the 2D image display portion 100 may be converted into 3D images, and thus, the 3D image display device 300 may be operated in 3D mode. By contrast, if the 2D/3D converting part 200 is turned off, 2D images from the 2D image display portion 100 may pass through the 2D/3D converting part 200 and be displayed in 2D. In this case, the 3D image display device 300 may be operated in 2D mode.

In exemplary embodiments, the 2D/3D converting part 200 may include a lenticular device 250. The lenticular device 250 may include a third substrate 210, a fourth substrate 220 facing the third substrate 210, and a liquid crystal lens layer 230 interposed between the third and fourth substrates 210 and 220. A lower electrode may be disposed on the third substrate 210, and an upper electrode may be disposed on the fourth substrate 220. One of the upper and lower electrodes may have a plate-like shape that wholly covers a surface of the substrate, and the other may include a plurality of electrodes that extend along a specific direction. The plurality of electrodes may be parallel to each other and may be spaced apart from each other by a specific distance.

The liquid crystal lens layer 230 may include a twist-nematic liquid crystal layer. Further, the liquid crystal may normally be a white liquid crystal layer.

The 2D/3D converting part 200 may further include a third polarizing plate 260 disposed on the lenticular device 250 and a spacing substrate 280 interposed between the lenticular device 250 and the second polarizing plate 162. The spacing substrate 280 may be formed of a transparent material, such as glass or plastic. In addition, the spacing substrate 280 may be thick enough so that the focal points of the lenses of the liquid crystal lens layer 230 may be positioned between the pixels of the liquid crystal display panel 150 and the lenses of the liquid crystal lens layer 230.

A bottom surface of the spacing substrate 280 may be attached and fixed to a top surface of the second polarizing plate 162 by a first optical adhesive 291, and a top surface of the spacing substrate 280 may be attached and fixed to a bottom surface of the lenticular device 250 by a second optical adhesive 292. The spacing substrate 280 and the first and second optical adhesives 291 and 292 may be formed of optically transparent materials. In some embodiments, at least one of the spacing substrate 280 and the first and second optical adhesives 291 and 292 may have substantially the same refractive index as at least one of the liquid crystal display panel 150 and the lenticular device 250.

The backlight unit 10 may be disposed on a back surface of the first polarizing plate 161 and be configured to generate light. The backlight unit 10 may include a light source, such as a light-emitting diode or a cold cathode fluorescent lamp. The first polarizing plate 161 may allow a light component parallel to a first polarization axis of the first polarizing plate 161 to propagate toward the liquid crystal display panel 150.

Figure 2:
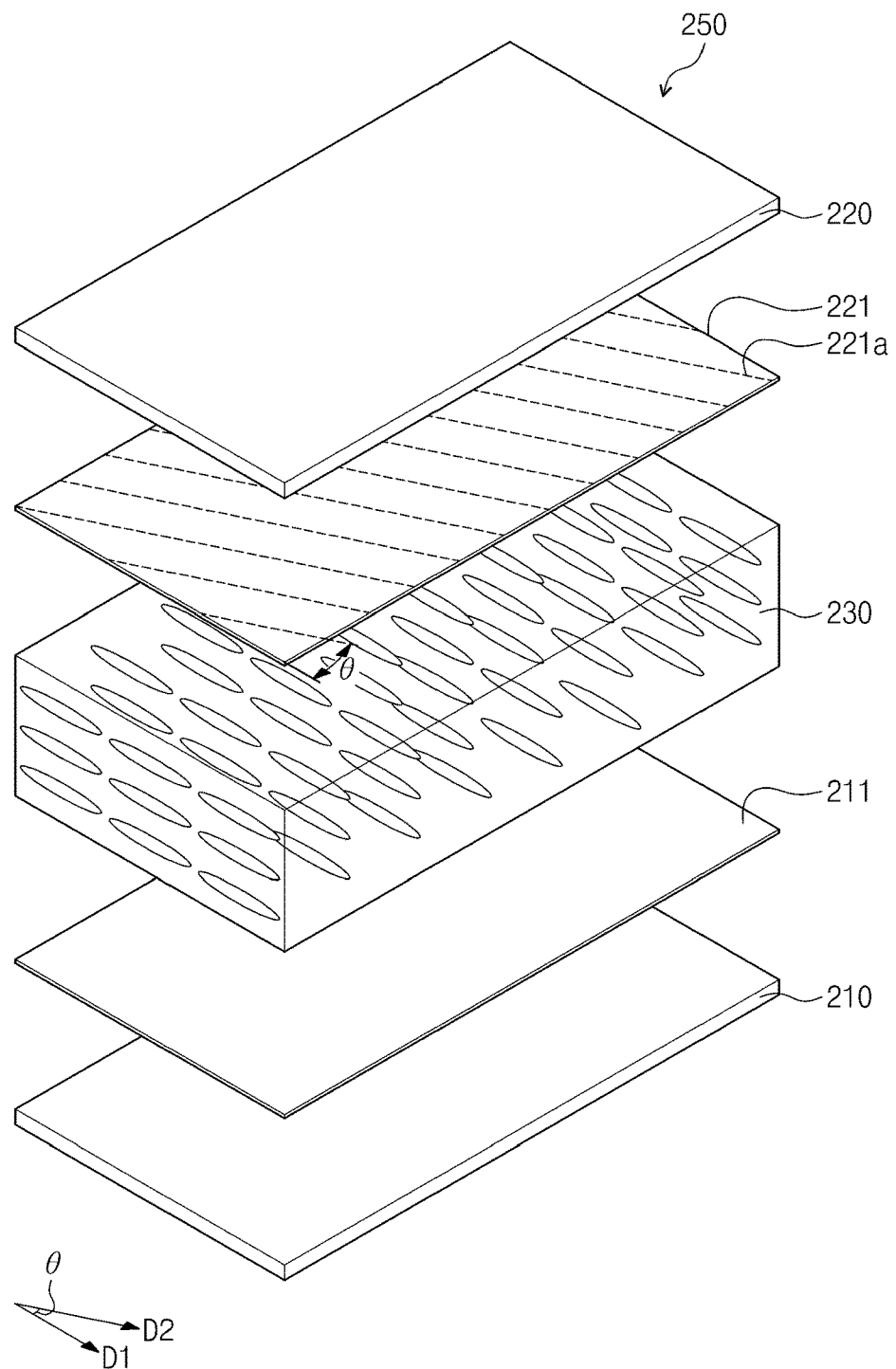
FIG. 2 is an exploded perspective view of a lenticular device of FIG. 1.

FIG. 2 is an exploded perspective view of a lenticular device of FIG. 1.

Referring to FIG. 2, as described above, the lenticular device 250 may include the third substrate 210, the fourth substrate 220 facing the third substrate 210, and the liquid crystal lens layer 230 interposed between the third and fourth substrates 210 and 220.

The third and fourth substrates 210 and 220 may be plate-shaped elements made of a transparent material, such as glass or plastic, and a lower electrode 211 and an upper electrode 221 may be disposed on the third and fourth substrates 210 and 220, respectively.

The lower electrode 211 may be formed by depositing a transparent conductive material, such as ITO or IZO, on a whole top surface of the third substrate 210.

The upper electrode 221 may include a plurality of stripe-shaped electrodes 221a that extend along a specific direction. The plurality of stripe-shaped electrodes 221a may be parallel to each other and may be spaced apart from each other by a predetermined distance. The plurality of stripe-shaped electrodes 221a may be formed by patterning a transparent electrode layer, such as ITO or IZO, using, for example, a photolithography technology.

As shown in FIG. 2, let a direction parallel to the short sides of the third and fourth substrates 210 and 220 be defined as a first direction D1. Then, the plurality of stripe-shaped electrodes 221a may extend in a second direction D2 that is inclined at an angle θ with respect to the first direction D1. In other words, the angle θ between the first direction D1 and the second direction D2 may be non-zero.

Figure 3:
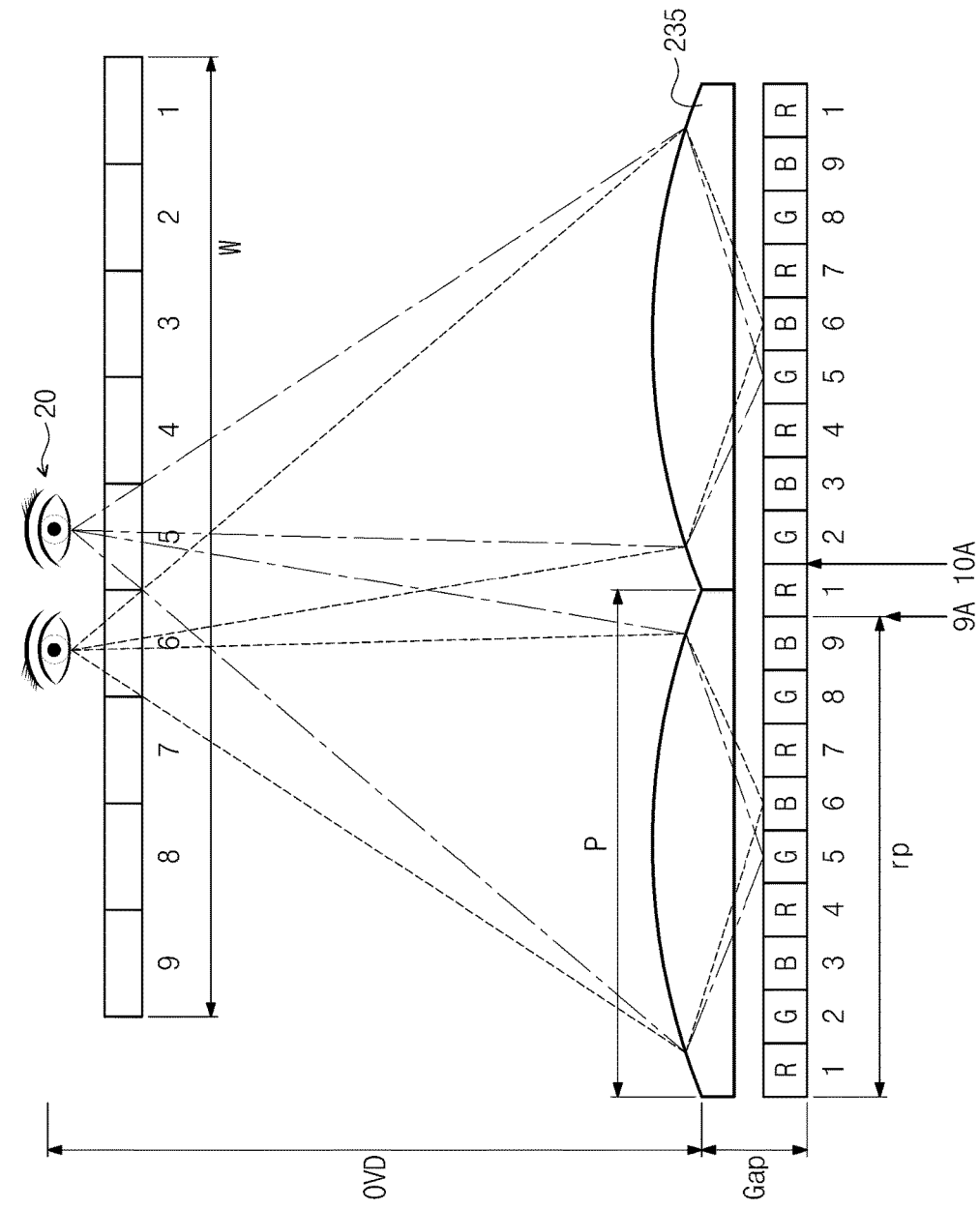
FIG. 3 is a schematic diagram that illustrates a multi-view 3D image display device according to exemplary embodiments of the inventive concept.

FIG. 3 is a schematic diagram that illustrates a multi-view 3D image display device according to exemplary embodiments of the inventive concept. For the sake of simplicity, two lenticular components, repeatedly arranged R, G and B pixels associated therewith, and a viewpoint position that corresponds to the pixels are illustrated in FIG. 3.

As shown in FIG. 3, a 3D image display device displays an image having nine viewpoints (for example, first to ninth viewpoints 1-9) and a viewer 20 sees the 3D image display device at the fifth and sixth viewpoints 5 and 6 positions of the nine viewpoints 1-9. The viewer 20 will see two different pixels (e.g., green and blue pixels G and B) through his or her right and left eyes. In other words, due to this binocular disparity, different pixels can be seen through both eyes of the viewer 20, and thus, the viewer 20 will perceive a two-dimensional image as a three-dimensional object.

The lower electrode 211 on the third substrate 201 and the stripe-shaped electrodes 221a on the fourth substrate 220 generate an electric field that forms at least one least one liquid crystal lens 235 in the lenticular device 250, when the 2D/3D converting part 200 is switched into the 3D mode. An optimal viewing distance (OVD) from the liquid crystal lens 235 of the lenticular device 250 to the eyes of the viewer may be a fixed value provided by a designer. There may be a gap between the pixels and a surface of the liquid crystal lens 235. In this case, an optimal viewing width W may be given by the following formula 1.

$$W = \frac{rp \times OVD}{\text{gap}},$$ [Formula 1]

where a horizontal pixel period rp is the number of pixels used to display an image having N viewpoints, which may differ from the number of viewpoints N. In exemplary embodiments, the horizontal pixel period rp may be selected to satisfy the following formula 2.

$$N < rp < (N+1).$$ [Formula 2]

In other words, in the case where an image with 9 viewpoints is displayed, the horizontal pixel period rp may be greater than 9 and less than 10.

Further, a pitch P of each liquid crystal lenses 235 may be selected to satisfy the following formula 3.

$$\left(\frac{N}{S}\right)A < P < \left(\frac{(N+1)}{S}\right)A,$$ [Formula 3]

where N is the number of viewpoints and is an integer ≥1, S is the number of the liquid crystal lenses 235 used to form N viewpoints and is an integer ≥1, and A is a width of each pixel in the row direction.

For example, if one liquid crystal lens 235 is used to form nine viewpoints, the numbers N and S are 9 and 1, respectively.

According to the formula 3, the pitch P of the liquid crystal lens 235 for realizing nine viewpoints ranges from 9A to 10A.

Figure 4:
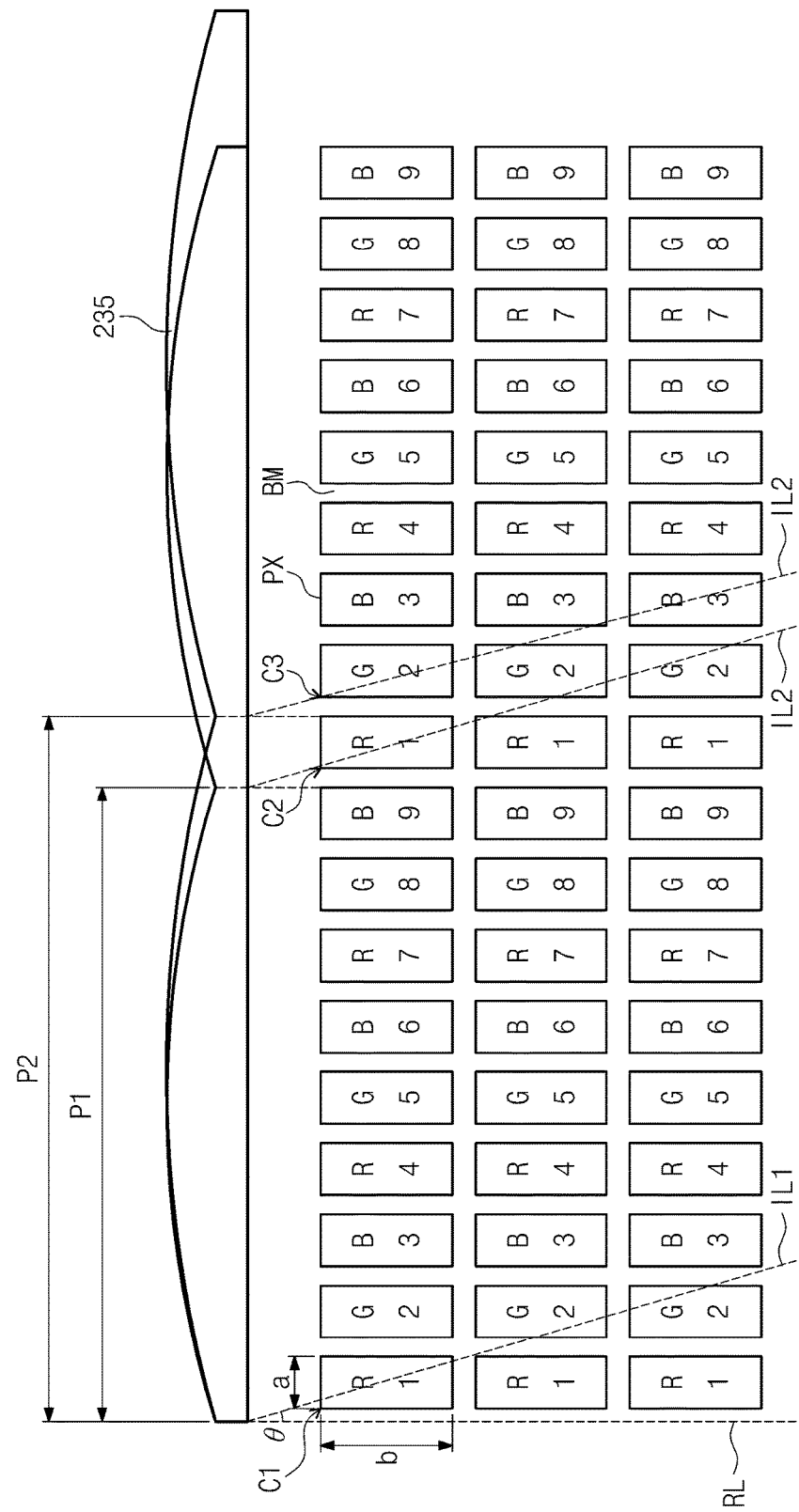
FIG. 4 is a schematic diagram that illustrates the correlation between liquid crystal lenses and pixels.

FIG. 4 is a schematic diagram that illustrates the correlation between liquid crystal lenses and pixels.

Referring to FIG. 4, the pixels PX may be arranged in the row and column directions to form a matrix-shaped structure. The color pixels may be arranged so that groups of red, green, and blue color pixels R, G, and B repeat in the row direction and each columns of color pixels is the same color. For simplicity of description, the pixels PX of each row will be denoted with the viewpoint numbers 1 to 9, respectively. To prevent light leakage, a black matrix BM may be disposed between the pixels PX.

The liquid crystal lenses 235 may be arranged in the row direction, and each liquid crystal lens 235 may have a semi-cylinder shape and be elongated parallel to inclined lines IL1 and IL2 at a predetermined angle θ with respect to a reference line RL in the column direction. Here, each of the inclined lines IL1 and IL2 may be positioned between adjacent liquid crystal lenses 235 to delimit a boundary between the adjacent liquid crystal lenses 235. For example, the inclined line IL2 defines a beginning position of the second liquid crystal lens and an end position of the first liquid crystal lens.

As exemplarily shown in FIG. 4, each of the liquid crystal lenses 235 may be disposed to cover 9-10 pixels in each row. For example, each liquid crystal lens 235 may have a pitch that is greater than a distance from an n-th pixel to an (n+9)-th pixel. hereinafter referred as to a first pitch P 1, and less than a distance from an n-th pixel to an (n+10)-th pixel, hereinafter referred as to a second pitch P2, where n is an integer ≥one.

If each liquid crystal lens 235 has the first pitch P1, the inclined line IL1 of the first liquid crystal lens may pass through a first vertex C1 of pixel (1, 1), and the inclined line IL2 of the second liquid crystal lens may pass through a first vertex C2 of pixel (1, 10). Here, numbers in parentheses denote row and column coordinates, respectively, of the corresponding pixel. If each liquid crystal lens 235 has the second pitch P2, the inclined line IL1 of the first liquid crystal lens may pass through the first vertex C1 of pixel (1, 1) pixel, and the inclined line IL2 of the second liquid crystal lens may pass through a first vertex C3 of pixel (1, 11).

In some embodiments, the pitch of the liquid crystal lens 235 may be a value between the first and second pitches P1 and P2. In this case, the inclined line IL2 of the second liquid crystal lens may pass through a position between the first vertex C2 of pixel (1, 10) and the first vertex C3 of pixel (1, 11).

The liquid crystal lens 235 of FIG. 4 may be configured so that the tilt angle θ thereof satisfies the inequality of following formula 4.

$$\theta = \tan^{-1}(q),$$ [Formula 4]

where q is a ratio of a width 'a' of each pixel PX measured in the row direction to a length 'b' of each pixel PX measured in the column direction. In other words, the parameter q is an aspect ratio of each pixel.

In exemplary embodiments, if the aspect ratio q is 1/3, the tilt angle θ may range from 17° to $\tan^{-1}(1/3)$ or range from $\tan^{-1}(1/3)$ to 19°. Here, $\tan^{-1}(1/3)$ is about 18.5°.

In other embodiments, if the aspect ratio q is 1/6, the tilt angle θ may range from 8° to $\tan^{-1}(1/6)$ or range from $\tan^{-1}(1/6)$ to 10°. Here, $\tan^{-1}(1/6)$ is about 9.4°.

Figure 5:
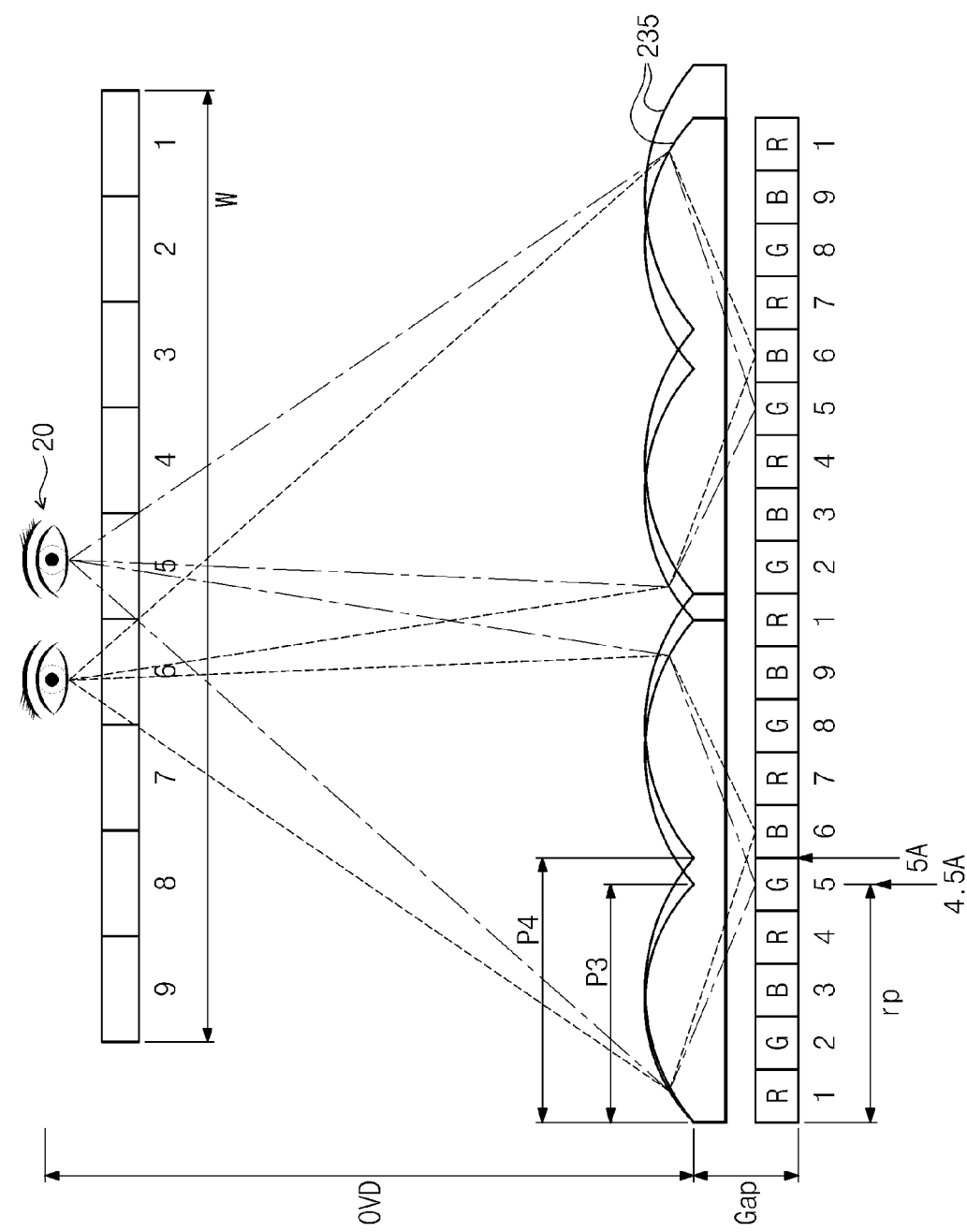
FIG. 5 is a schematic diagram that illustrates a multi-view 3D image display device according to exemplary embodiments of the inventive concept.
Figure 6:
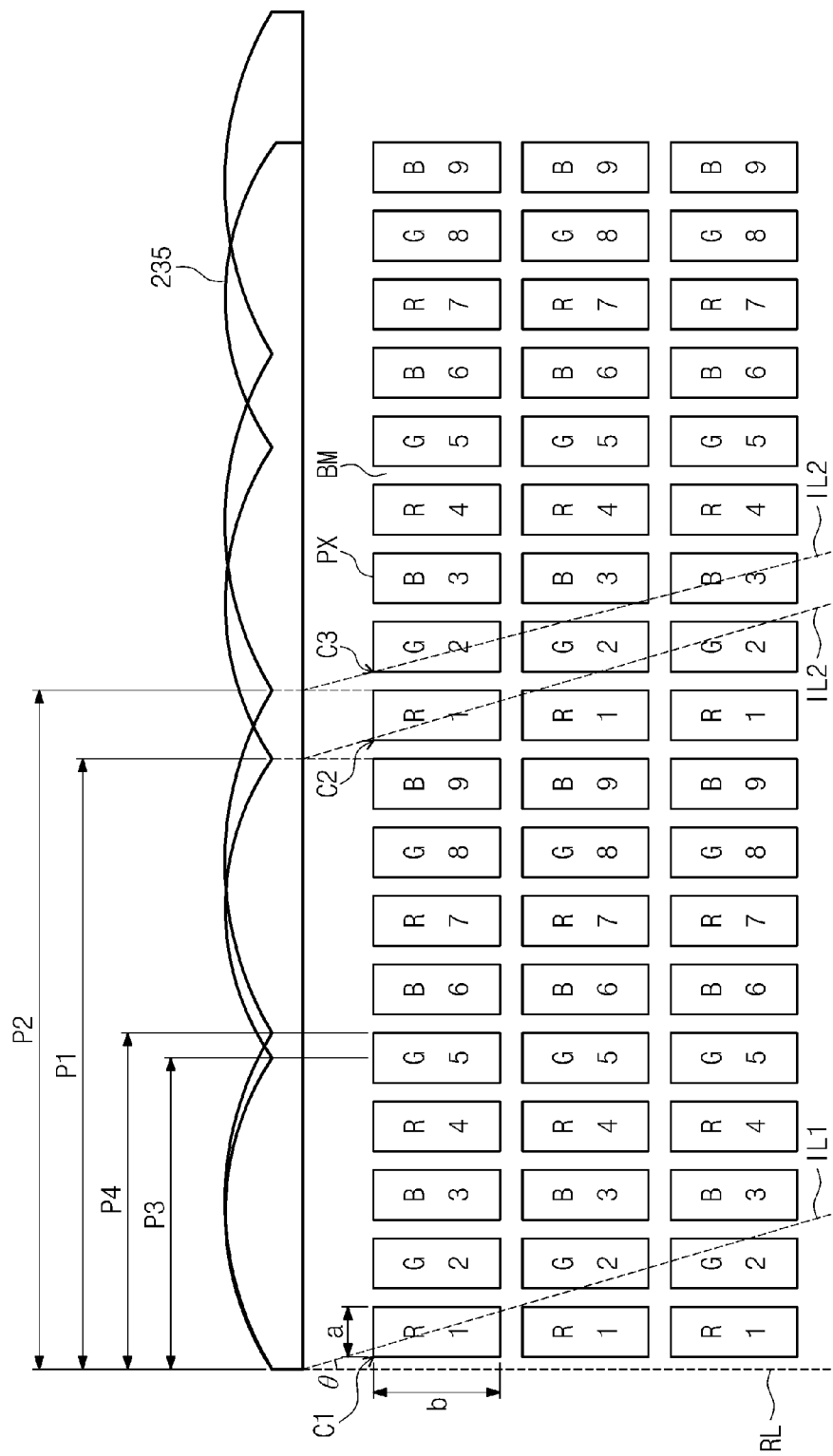
FIG. 6 is a schematic diagram that illustrates the correlation between liquid crystal lenses and pixels in the multi-view 3D image display device of FIG. 5.

FIG. 5 is a schematic diagram that illustrates a multi-view 3D image display device according to exemplary embodiments of the inventive concept, and FIG. 6 is a schematic diagram that illustrates the correlation between liquid crystal lenses and pixels in the multi-view 3D image display device of FIG. 5.

FIG. 5 shows a multi-view 3D image display device that has a decreased horizontal pixel period rp, as compared with that of FIG. 4. For example, a multi-view 3D image display device of FIG. 5 may have a horizontal pixel period rp that is half that of FIG. 4.

As described above, the horizontal pixel period rp is the number of pixels used to display N viewpoints, which may differ from the number N of the viewpoints. In exemplary embodiments, the horizontal pixel period rp may be selected to satisfy the following formula 5.

$$\frac{N}{2} < rp < \frac{(N+1)}{2}.$$  [Formula 5]

In other words, if an image that has 9 viewpoints are displayed, the horizontal pixel period rp may be greater than 4.5 and less than 5.

Further, a pitch P of each liquid crystal lens 235 may satisfy the above formula 3. If the horizontal pixel period rp satisfies formula 5, the number S of liquid crystal lenses 235 used to form N viewpoints is two.

Thus, according to formula 3, a pitch P of the liquid crystal lens 235 that can realize nine viewpoints may be larger than 4.5A and less than 5A.

As exemplarily shown in FIG. 6, each liquid crystal lens 235 may be disposed to cover from 4.5-5 pixels in each row. For example, each liquid crystal lens 235 may have a pitch that is greater than a third pitch P3 and less than a fourth pitch P4.

If each liquid crystal lens 235 has the third pitch p3, the inclined line IL1 defining the front position of the first liquid crystal lens may pass through the first vertex C1 of pixel (1, 1), and the inclined line IL2 between the second and third liquid crystal lenses may pass through the first vertex C2 of pixel (1, 10). If the first pitch P1 is defined as a distance from the reference line RL to the first vertex C2 of pixel (1, 10), the third pitch P3 may be half the first pitch P1.

If each liquid crystal lens 235 has the fourth pitch P4, the inclined line IL1 defining the front position of the first liquid crystal lens may pass through the first vertex C1 of pixel (1, 1), and the inclined line IL2 between the second and third liquid crystal lenses may pass through the first vertex C3 of pixel (1, 11). If the second pitch P2 is defined as a distance from the reference line RL to the first vertex C3 of pixel (1, 11) pixel, the fourth pitch P4 may be half the second pitch P2.

In some embodiments, the pitch of the liquid crystal lens 235 may be between the first and second pitches P1 and P2. In this case, the inclined line IL2 between the second and third liquid crystal lenses may pass through a position between the first vertex C2 of pixel (1, 10) and the first vertex C3 of pixel (1, 11).

The liquid crystal lens 235 of FIG. 6 may be configured so that the tilt angle θ thereof satisfies formula 4.

In exemplary embodiments, if the aspect ratio q is 1/3, the tilt angle θ may range from 17° to $\tan^{-1}(1/3)$ or range from $\tan^{-1}(1/3)$ to 19°. Here, $\tan^{-1}(1/3)$ is about 18.5°.

In other embodiments, if the aspect ratio q is 1/6, the tilt angle θ may range from 8° to $\tan^{-1}(1/6)$ or range from $\tan^{-1}(1/6)$ to 10°. Here, $\tan^{-1}(1/6)$ is about 9.4°.

Figure 7:
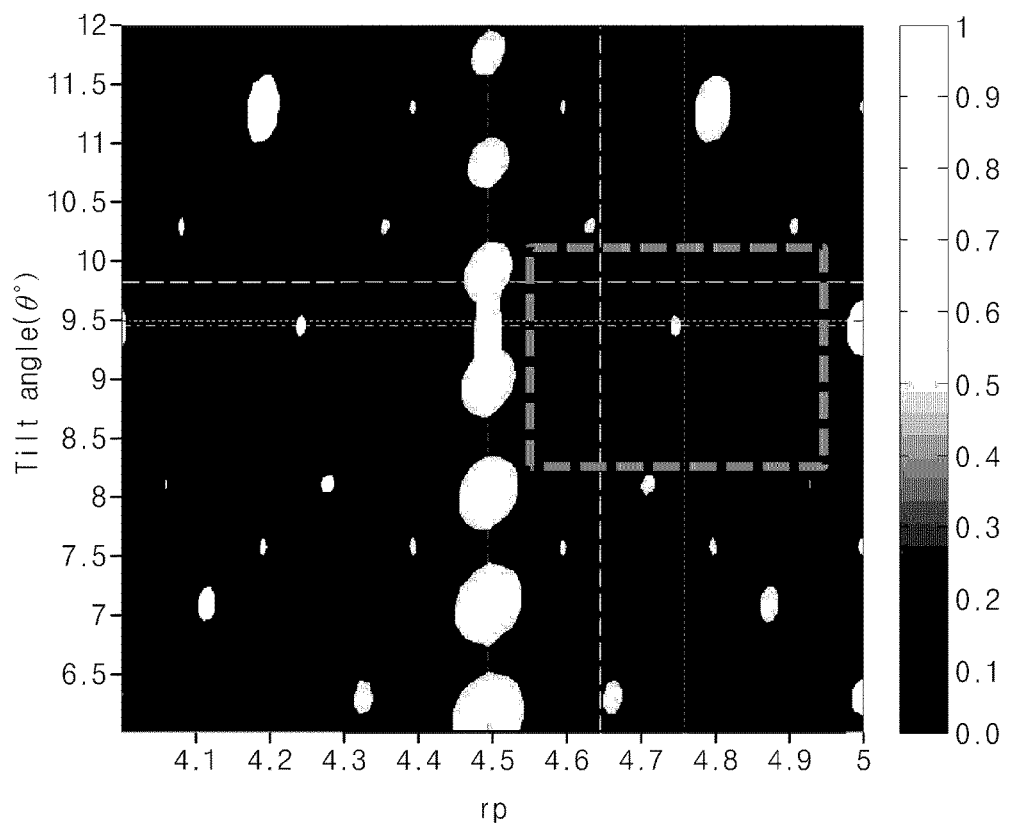
FIG. 7 is a diagram that illustrates how brightness uniformity varies when a tilt angle and a period of a liquid crystal lens change.

FIG. 7 is a diagram that illustrates how brightness uniformity varies when a tilt angle and period of a liquid crystal lens change.

Referring to FIG. 7, when the horizontal pixel period rp was 4.5, there were a plurality of bright regions in a black background. On the other hand, the brightness uniformity improves when the horizontal pixel period rp increases to greater than 4.5 than when the horizontal pixel period rp is 4.5.

In addition, when the tilt angle θ ranges from 8° to $\tan^{-1}(1/6)$ (i.e., 9.4°) or from $\tan^{-1}(1/6)$ to 10°, there was no white region; that is, a relatively good brightness uniformity was obtained.

From this result, a liquid crystal lens may be configured to have a horizontal pixel period rp that is greater than 4.0 and less than 4.5 or greater than 4.5 and less than 5.0 and a tilt angle θ that is greater than 8° and less than $\tan^{-1}(1/6)$ (i.e., 9.4°) or greater than $\tan^{-1}(1/6)$ and less than 10°. In this case, the uniformity of brightness can be improved.

In addition, if the horizontal pixel period rp is greater than 4.0 and less than 4.5, it may be necessary to increase the number of the liquid crystal lenses provided in a given area of the liquid crystal display panel. If the number of the liquid crystal lenses increases, the number of interconnection lines provided on a peripheral region of the liquid crystal display panel to supply voltages to the liquid crystal lens electrodes may increase. This means that the liquid crystal display panel should have an increased bezel width.

By contrast, if the pixel horizontal period rp is greater than 4.5 and less than 5.0, it is possible to reduce the number of the liquid crystal lenses provided in a given area of the liquid crystal display panel. If the number of the liquid crystal lenses decreases, the number of the interconnection lines provided on a peripheral region of the liquid crystal display panel to supply voltages to the liquid crystal lens electrodes may decrease. This means that the liquid crystal display panel can have a reduced bezel width.

In this respect, a liquid crystal lens may be configured to have a horizontal pixel period rp that is greater than 4.5 and less than 5.0 and the tilt angle θ that is greater than 8° and less than $\tan^{-1}(1/6)$ (i.e., 9.40) or greater than $\tan^{-1}(1/6)$ and less than 10°. In other words, a liquid crystal lens may be configured so that the horizontal pixel period rp and tilt angle θ thereof are in a rectangular region delimited by a dashed line of FIG. 7. In this case, it is possible to improve the brightness uniformity while not increasing the bezel width of the liquid crystal display panel.

FIGS. 8A through 8D are graphs that show a brightness distribution and an x-talk, when a tilt angle θ was 9.3° and a horizontal pixel period rp was 4.5, and FIGS. 9A through 9D are graphs that show a brightness distribution and an x-talk, when a tilt angle θ was 9.3° and a horizontal pixel period rp was 4.67.

Figure 8A:
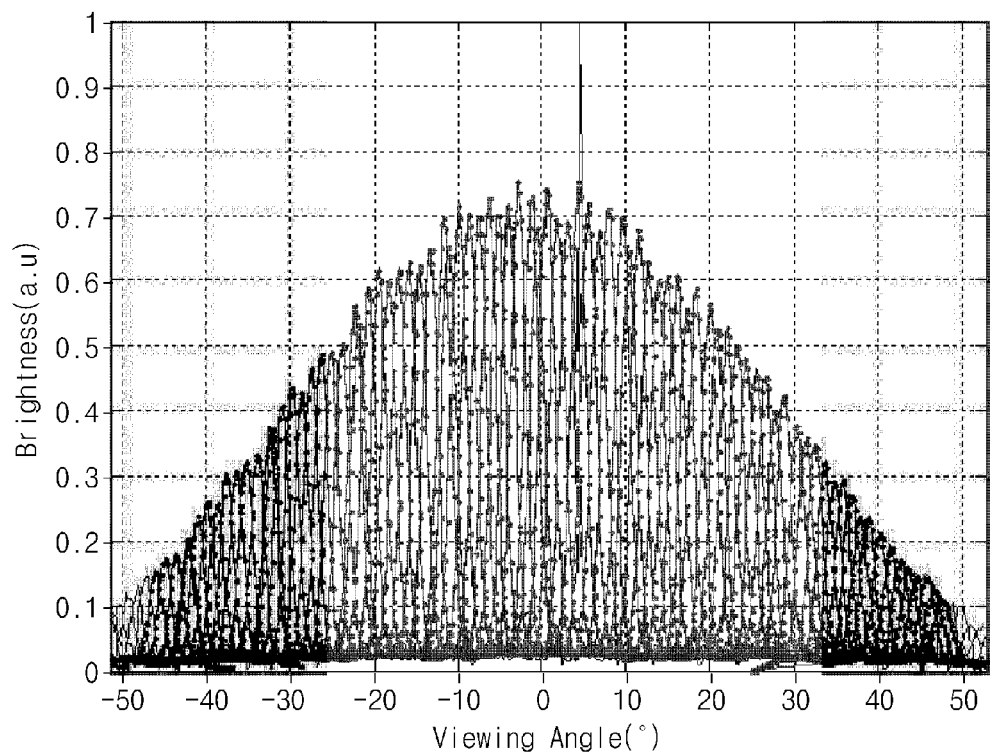
FIGS. 8A through 8D are graphs that show a brightness distribution and an x-talk, when a tilt angle θ was 9.30 and a pixel horizontal period rp was 4.5.
Figure 8B:
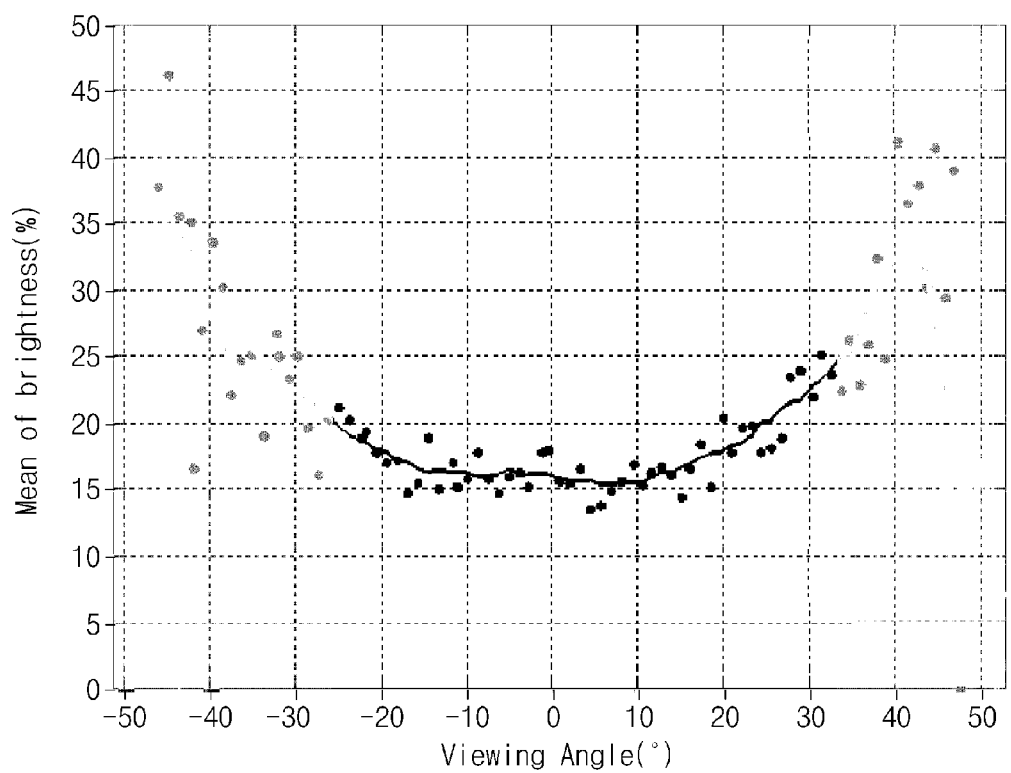
Figure 8C:
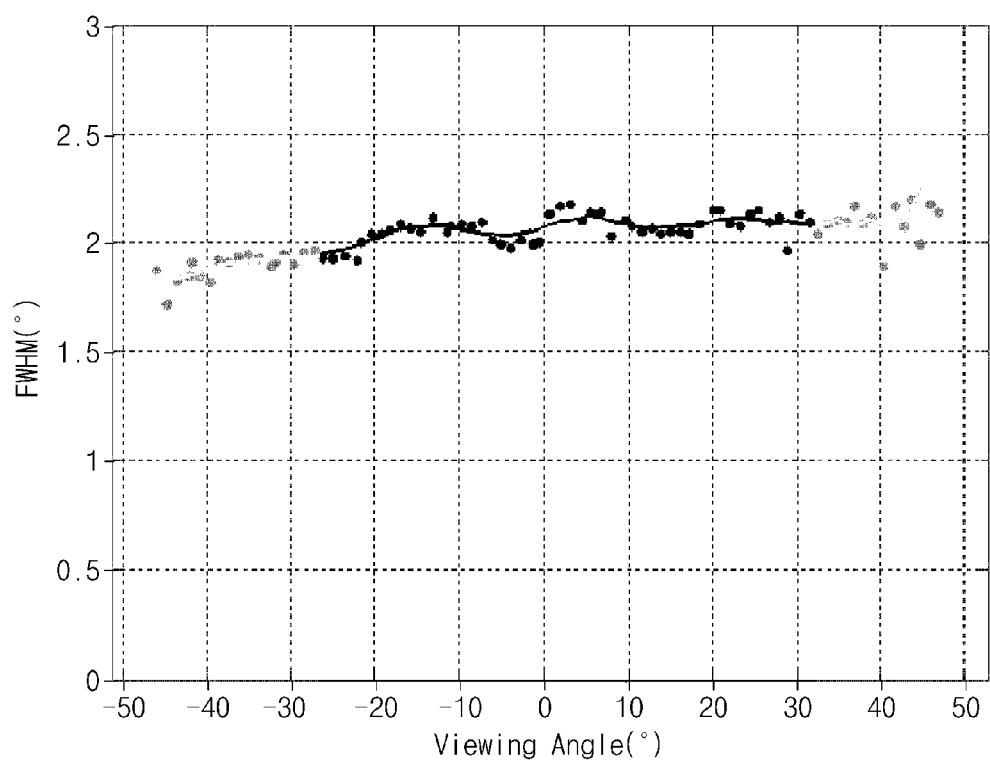

FIGS. 8A and 8B show a brightness distribution and a brightness mean with respect to a viewing angle, respectively. As shown in FIGS. 8A and 8B, a brightness variation was a maximum at a horizontal pixel period rp of 4.5. As shown in FIG. 8C, a mean full width half maximum (FWHM) of the brightness distribution graph was about 2.1.

Figure 9A:
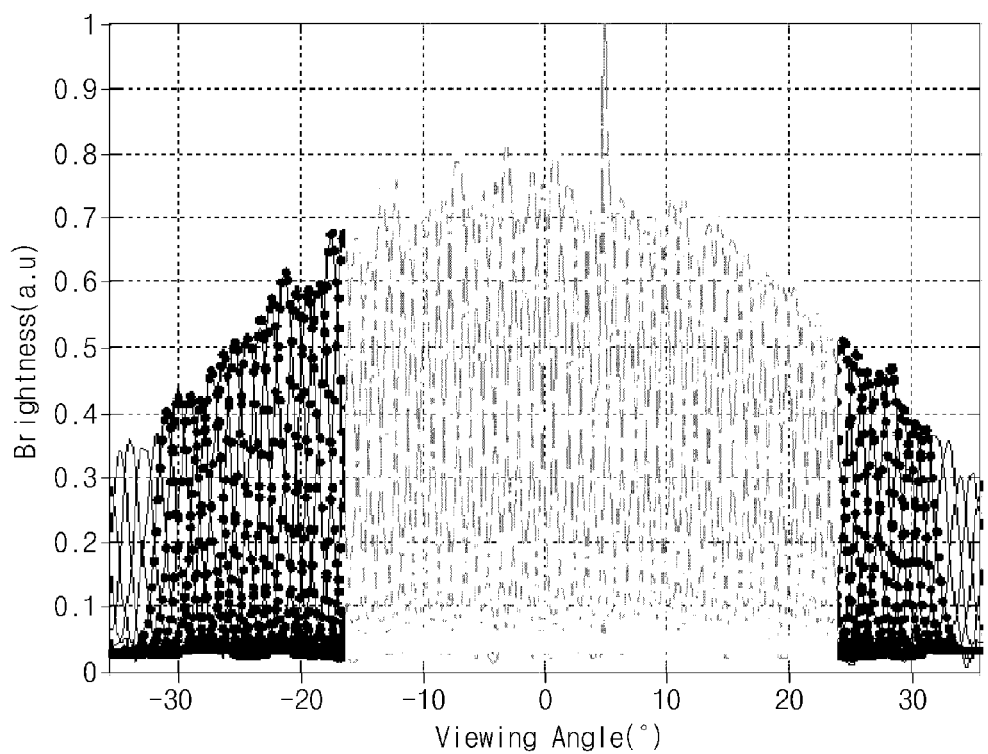
FIGS. 9A through 9D are graphs that show a brightness distribution and an x-talk, when a tilt angle θ was 9.3° and a pixel horizontal period rp was 4.67.
Figure 9B:
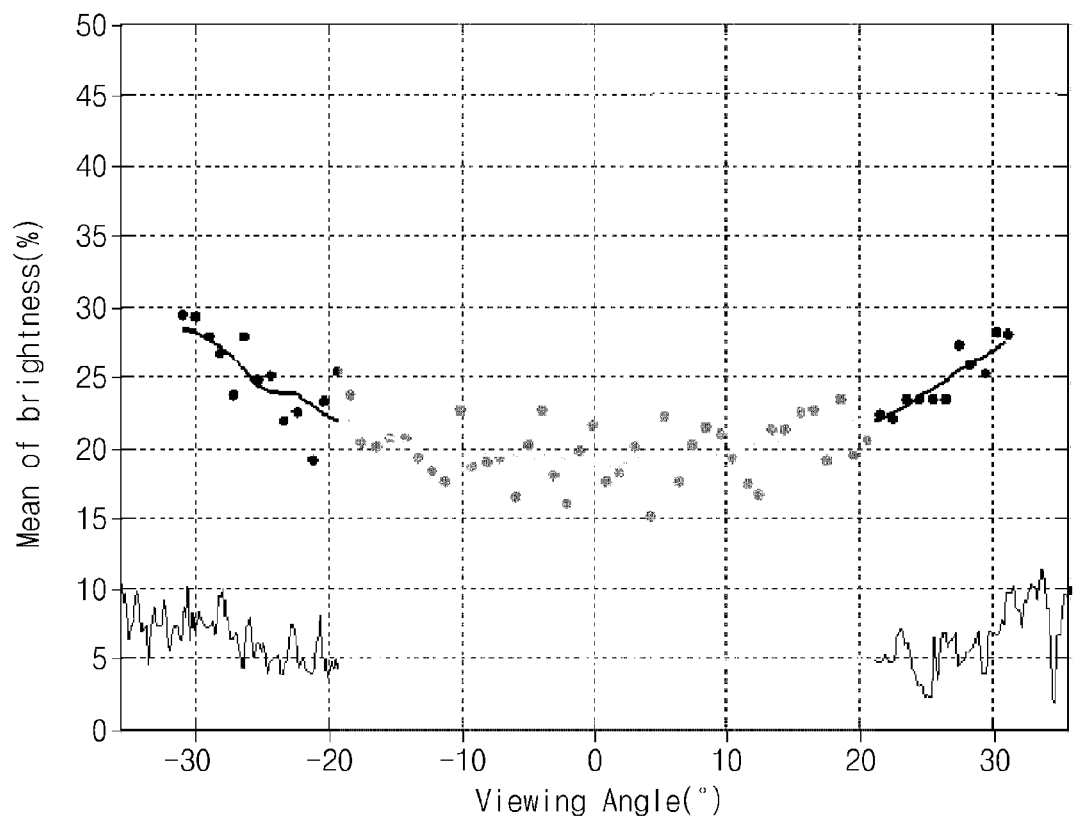
Figure 9C:
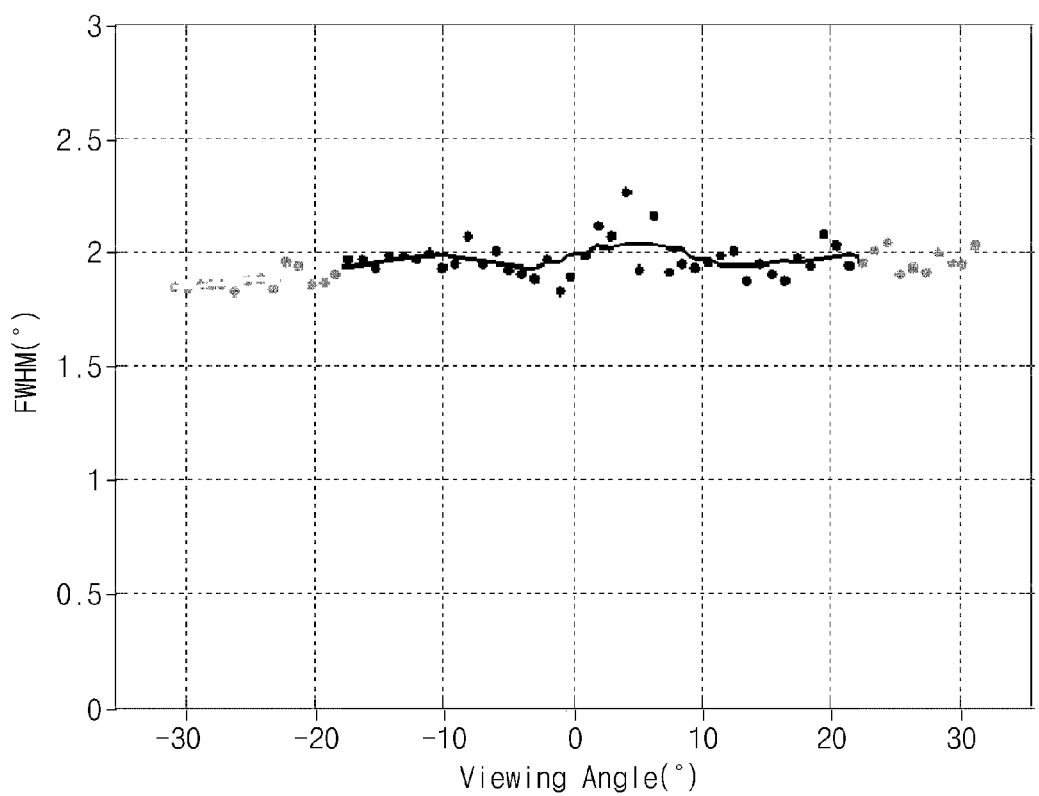

FIGS. 9A and 9B show a brightness distribution and a brightness mean with respect to a viewing angle, when the horizontal pixel period rp was 4.67. FIGS. 9A and 9B show that a brightness variation with respect to the viewing angle was reduced when compared with FIGS. 8A and 8B. As shown in FIG. 9C, the mean FWHM of the brightness distribution graph was reduced to about 2.0.

Figure 8D:
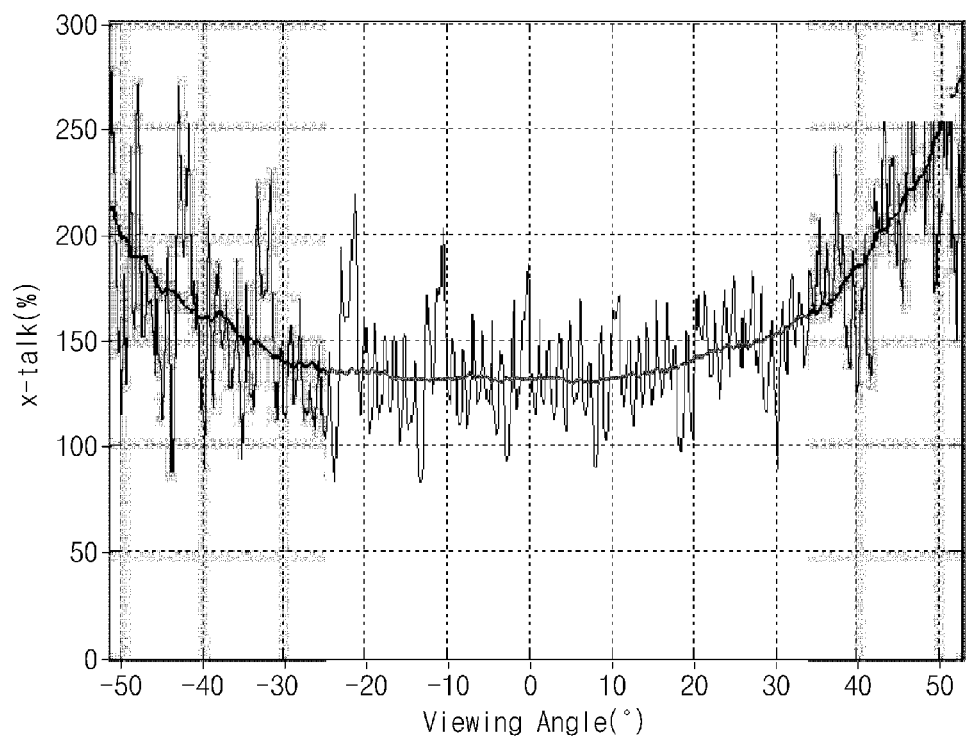
Figure 9D:
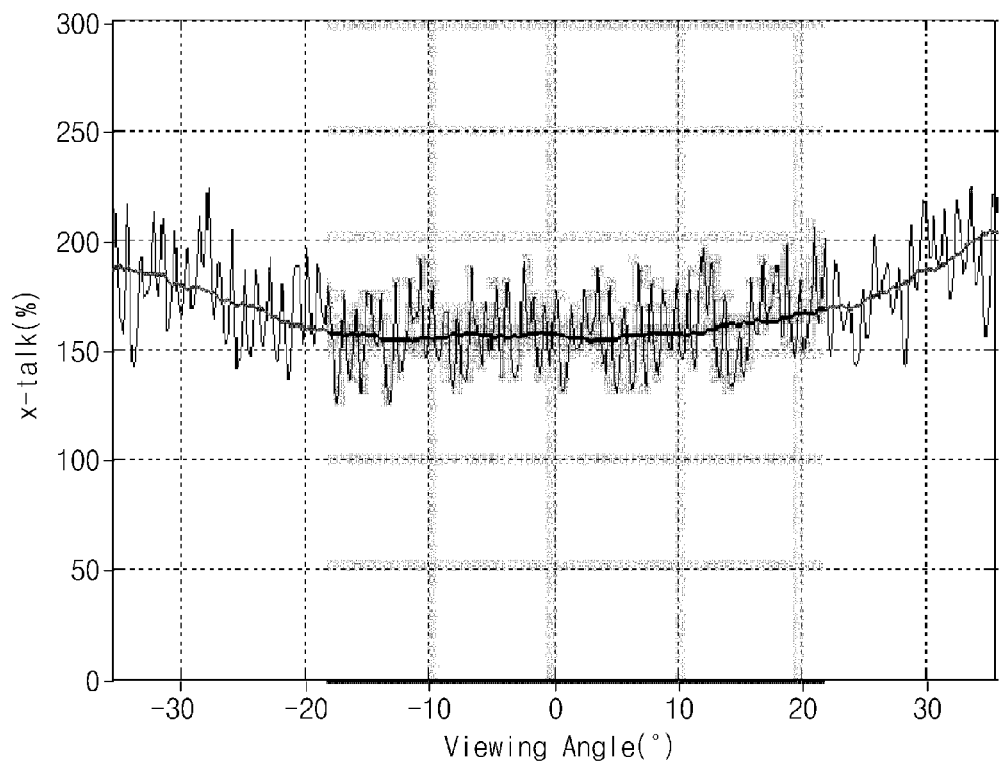

Referring to FIG. 8D, when the horizontal pixel period rp was 4.5, an x-talk was widely distributed in a range of 100%-250%, and the larger the viewing angle, the higher the x-talk mean. As shown in FIG. 9D, when the horizontal pixel period rp was increased to 4.67, the x-talk was narrowly distributed in a range of 150%-200%, and the x-talk mean had a lowered rate of increase when the viewing angle increased.

These results show that, when the tilt angle θ is fixed to 9.3°, a 3D confusion will be reduced when the horizontal pixel period rp is 4.67 as compared to a horizontal pixel period rp is 4.5.

According to exemplary embodiments of the inventive concept, a multi-view device may be provided so that a pitch P in the row direction thereof satisfies a condition $$\left(\frac{N}{S}\right)A < P < \left(\frac{(N+1)}{S}\right)A,$$

and thus, it is possible to improve a brightness uniformity and reduce an image confusion during a 3D operation mode.

While exemplary embodiments of the inventive concepts have been particularly shown and described, it will be understood by one of ordinary skill in the art that variations in form and detail may be made therein without departing from the spirit and scope of the attached claims.

What is claimed is:

1. A three-dimensional display panel, comprising:
    an array of pixels arranged in row and column directions; and
    a viewpoint forming device including at least one multi-view forming unit configured to form N viewpoints,
    wherein the at least one multi-view forming unit has a longitudinal axis inclined by an angle of θ with respect to a column direction of the pixels, and
    a pitch P of the at least one multi-view forming unit in the row direction thereof satisfies $$\left(\frac{N}{S}\right)A < P < \left(\frac{(N+1)}{S}\right)A$$

wherein N is the number of the viewpoints and is an integer greater than or equal to 1, S is the number of multi-view forming units used to form the N viewpoints and is an integer greater than 1, and A is a width of each pixel in the row direction,
    wherein a number of pixels rp used to display N viewpoints satisfies N/2<rp<(N+1)/2, when S is equal to 2.

2. The display panel of claim 1, wherein the angle θ satisfies an inequality of θ≠tan−1(q), wherein q is an aspect ratio of each pixel.

3. The display panel of claim 2, wherein, when the aspect ratio q is 1/3, the angle θ ranges from 17° to tan$^{-1}$(1/3) or range from tan$^{-1}$(1/3) to 19°.

4. The display panel of claim 2, wherein, when the aspect ratio q is 1/6, the angle θ ranges from 8° to tan$^{-1}$(1/6) or range from tan$^{-1}$(1/6) to 10°.

5. The display panel of claim 1, wherein the multi-view forming unit is configured to have an optimal viewing width W given by:

$$W = \frac{rp \times OVD}{gap},$$

wherein rp is a number of pixels used to display N viewpoints, OVD is an optimal viewing distance from the at least one multi-view forming unit to a viewer's eyes, and gap is a distance from the pixels to a surface of the at least one multi-view forming unit.

6. The device of claim 1, wherein the viewpoint forming device includes a lenticular lens serving as the multi-view forming unit.

7. The display panel of claim 1, wherein the viewpoint forming device comprises:
    a lower substrate with a lower electrode;
    an upper substrate with an upper electrode, wherein the upper electrode faces the lower electrode and includes a plurality of electrodes spaced apart from each other in at least one direction, wherein each of the plurality of electrodes extends along a longitudinal direction inclined by the angle θ with respect to the column direction of the pi; and
    a liquid crystal lens layer interposed between the lower and upper substrates,
    wherein the lenticular lens is formed by controlling orientations of liquid crystal molecules in the liquid crystal lens layer.

8. The display panel of claim 7, wherein three-dimensional display panel is switched between a 2D operation mode and a 3D operation mode by turning on or off the at least one lenticular lens.

9. A three-dimensional display panel, comprising:
    an array of pixels arranged along row and column directions; and
    at least one lenticular lens configured to form N viewpoints in different directions,
    wherein the at least lenticular lens has a longitudinal axis inclined by an angle of θ with respect to a column direction of the pixel, and
    wherein the at least one lenticular lens is configured to have an optimal viewing width W given by:

$$W = \frac{rp \times OVD}{gap},$$

wherein rp is a number of pixels used to display N viewpoints, OVD is an optimal viewing distance from the at least one lenticular lens to a viewer's eyes, and gap is a distance from the pixels to a surface of the at least one lenticular lens,
    wherein the number of pixels rp used to display N viewpoints satisfies
    N/2<rp≤(N+1)/2, when S is equal to 2, and S is the number of lenticular lenses used to form the N viewpoints,
    wherein a pitch P of the lenticular lens in the row direction thereof satisfies $$\left(\frac{N}{S}\right)A < P < \left(\frac{(N+1)}{S}\right)A,$$

wherein N is the number of the viewpoints and is an integer greater than or equal to 1, S is the number of lenticular lens used to form the N viewpoints and is an integer greater than or equal to 1, and A is a width of each pixel in the row direction.

10. The display panel of claim 9, wherein the angle $\theta$ satisfies an inequality of $\theta \neq \tan-1(q)$, wherein q is an aspect ratio of each pixel.

11. The display panel of claim 9, wherein the three-dimensional display panel further comprises:
- a lower substrate with a lower electrode;
- an upper substrate with an upper electrode, wherein the upper electrode faces the lower electrode and includes a plurality of electrodes spaced apart from each other in at least one direction, wherein each of the plurality of electrodes extends along a longitudinal direction inclined by the angle $\theta$ with respect to the column direction of the pixels; and
- a liquid crystal lens layer interposed between the lower and upper substrates,
- wherein the lenticular lens is formed by using the lower electrode and the upper electrode to control orientations of liquid crystal molecules in the liquid crystal layer.

\* \* \* \* \*